United States Patent [19]

von Tobel

[11] Patent Number: 5,095,101
[45] Date of Patent: Mar. 10, 1992

[54] 1-AMINO-2,7-DI-[5'-(2"-CHLORO-4"-SUBSTITUTED AMINO-1,3,5-TRIAZIN-6"-YLAMINO)-2'-SULFOPHENYLAZO]-3,6-DISULFONIC ACIDS

[75] Inventor: Hans von Tobel, Riehen, Switzerland

[73] Assignee: Sandoz Ltd., Basle, Switzerland

[21] Appl. No.: 219,422

[22] Filed: Jul. 14, 1988

Related U.S. Application Data

[63] Continuation of Ser. No. 17,665, Feb. 24, 1987, abandoned, which is a continuation-in-part of Ser. No. 677,962, Dec. 4, 1984, abandoned.

[30] Foreign Application Priority Data

Dec. 10, 1983 [DE] Fed. Rep. of Germany ....... 3344718

[51] Int. Cl.$^5$ .................... C09B 62/09; D06D 1/382
[52] U.S. Cl. ................................. 534/634; 534/573; 544/208
[58] Field of Search ................... 534/617, 634, 637

[56] References Cited

U.S. PATENT DOCUMENTS

| | | | |
|---|---|---|---|
| 3,663,526 | 5/1972 | Oesterlein et al. | 534/631 X |
| 3,945,990 | 3/1976 | Ikeda et al. | 534/634 X |
| 4,351,640 | 9/1982 | Schaffer et al. | 534/634 X |

FOREIGN PATENT DOCUMENTS

| | | | |
|---|---|---|---|
| 0022489 | 1/1981 | European Pat. Off. | 534/634 |
| 0040460 | 11/1981 | European Pat. Off. | 534/634 |
| 0043796 | 1/1982 | European Pat. Off. | 534/634 |
| 0120807 | 10/1984 | European Pat. Off. | 534/634 |
| 0122423 | 10/1984 | European Pat. Off. | 534/634 |
| 3325758 | 9/1984 | Fed. Rep. of Germany | 534/634 |
| 1543282 | 10/1968 | France | 534/634 |
| 2368521 | 5/1978 | France | 534/634 |
| 53-117024 | 10/1978 | Japan | 534/634 |
| 1473062 | 5/1977 | United Kingdom | 534/634 |
| 1542773 | 3/1979 | United Kingdom | 534/634 |
| 1566921 | 5/1980 | United Kingdom | 534/634 |
| 2162193 | 1/1986 | United Kingdom | 534/634 |

Primary Examiner—Mary C. Lee
Assistant Examiner—Fiona Powers
Attorney, Agent, or Firm—Gerald D. Sharkin; Richard E. Vila; Melvyn M. Kassenoff

[57] ABSTRACT

The present invention provides compounds of the formula,

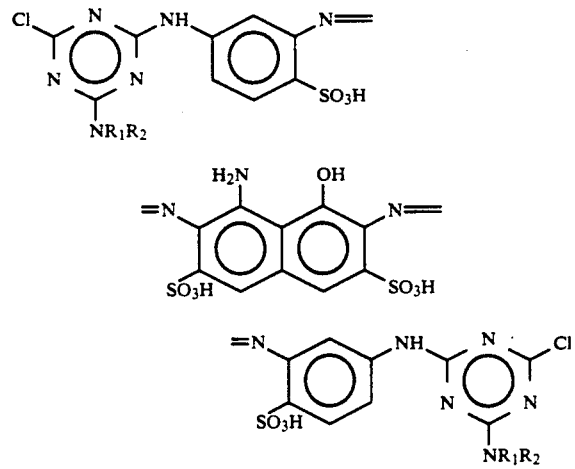

in which both groups —NR$_1$R$_2$ are identical;

R$_1$ is C$_{2-4}$alkyl, substituted by one or two hydroxy groups or by one —OR$_3$ groups, where R$_3$ is C$_{1-4}$alkyl or C$_{2-4}$hydroxyalkyl, and R$_2$ is hydrogen, C$_{2-4}$hydroxyalkyl or —CH$_2$CH$_2$CN, provided that when R$_2$ is —CH$_2$CH$_2$CN then R$_1$ can only be —CH$_2$CH$_2$OCH$_2$CH$_2$OH, and mixtures of such compounds, which compounds are in free acid or salt form, and are useful for dyeing or printing hydroxy group- or nitrogen-containing organic substrates, especially leather and textiles containing or consisting of natural or synthetic polyamides or of natural or regenerated cellulose; the most preferred substrate is textile material containing or consisting of cotton.

18 Claims, No Drawings

1-AMINO-2,7-DI-[5'-(2''-CHLORO-4''-SUBSTITUTED AMINO-1,3,5-TRIAZIN-6''-YLAMINO)-2'-SULFOPHENYLAZO]-3,6-DISULFONIC ACIDS

This is a continuation of application Ser. No. 07/017/665, filed Feb. 24, 1987 and now abandoned which is a continuation-in-part of application Ser. No. 06/677,962, filed Dec. 4, 1984 and now abandoned.

The present invention relates to monochlorotriazinyl disazo compounds, their preparation and their use as fibre reactive dyestuffs.

More particularly, this invention provides compounds which, in free acid form, correspond to formula I,

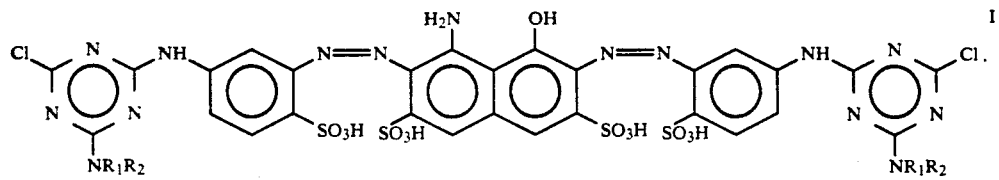

in which both groups —$NR_1R_2$ groups are identical,
$R_1$ is $C_{2-4}$alkyl, substituted by one or two hydroxy groups or by one —$OR_3$ group, where $R_3$ is $C_{1-4}$alkyl or $C_{2-4}$hydroxyalkyl, and
$R_2$ is hydrogen, $C_{2-4}$hydroxyalkyl or —$CH_2CH_2CN$, provided that when $R_2$ is —$CH_2CH_2CN$ then $R_1$ can only be —$CH_2CH_2OCH_2CH_2OH$,
or mixtures of such compounds, which compounds are in free acid or salt form.

In any hydroxy-substituted alkyl group the hydroxy group is bound to a carbon atom other than to the $C_1$-atom; furthermore, in any alkyl group substituted by two hydroxy groups the hydroxy groups are bound to different carbon atoms.

Any substituted $C_{2-4}$alkyl group may be straight chain or branched; preferably, any monohydroxy substituted alkyl group as defined for $R_1$ to $R_3$ contains two or three carbon atoms, most preferably two carbon atoms. Any dihydroxy substituted alkyl group as $R_1$ preferably contains three carbon atoms.

Any alkyl group substituted by —$OR_3$ is preferably linear, preferably, it is a $C_{2-3}$alkyl group containing a terminal —$OR_3$ group.

Any alkyl as $R_3$ is preferably methyl or ethyl, especially methyl.

$R_3$ is preferably $R_{3a}$, where $R_{3a}$ is methyl or —$CH_2CH_2OH$.

$R_1$ is preferably $R_{1a}$, where $R_{1a}$ is —$CH_2CH_2OH$,

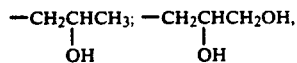

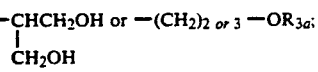 

more preferably it is $R_{1b}$, where $R_{1b}$ is —$CH_2CH_2OH$,

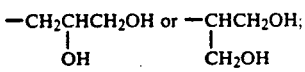

most preferably $R_1$ is —$CH_2CH_2OH$.

$R_2$ is preferably $R_{2a}$, where $R_{2a}$ is hydrogen or —$CH_2CH_2OH$; most preferably $R_2$ is hydrogen.

Preferred compounds of formula I are those wherein both groups —$NR_1R_2$ are —$NR_{1a}R_{2a}$ or

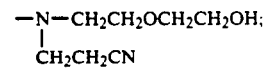

more preferred are compounds of formula I wherein both groups —$NR_1R_2$ are —$NHR_{1b}$ or

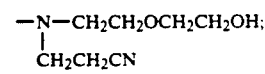

most preferred is the compound of formula I wherein both groups —$NR_1R_2$ are —$NHCH_2CH_2OH$.

The cations of the sulpho groups when the compounds of formula I are in salt form are not critical and may be any of those non-chromophoric cations common in the field of reactive dyestuffs provided that the obtained corresponding salts are water-soluble. Generally, in a compound of formula I the cations of the sulpho groups may be the same or different, e.g., the compound may be in a mixed salt form.

Examples of suitable cations are alkali metal cations and unsubstituted and substituted ammonium ions, such as lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

The present invention further provides a process for the preparation of the compounds of formula I comprising coupling 1-amino-8-hydroxynaphthalene-3,6-disulphonic acid on both sides with the diazonium salt of an amino compound of formula II,

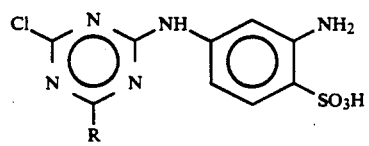

wherein chlorine or the group —$NR_1R_2$ as defined above, provided that for both coupling reactions identical amino compounds of formula II are employed, and reacting the resultant coupling product, wherein R is chlorine, with a compound of formula $HNR_1R_2$.

Preferably, in any amino compound of the formula II used as starting material R is the group —$NR_1R_2$ as defined above.

Diazotization of an amino compound of formula II and coupling reactions on both sides of 1-amino-8-hydroxynaphthalene-3,6-disulphonic acid may be effected in conventional manner. To carry out the coupling reactions the reaction mixture is first adjusted to an acid pH (of approximately 4) then the first coupling having been completed, the mixture is adjusted to a weakly alkaline pH (of approximately 7-8). Advantageously, both coupling steps are carried out in a one step process without any isolation of the acid coupling intermediate. This one step process gives practically 100% yields of the end coupling product.

Likewise, the condensation reaction to introduce the —NR$_1$R$_2$ group into the coupling product may be effected in accordance with conventional methods.

The compounds of formula I may be isolated in accordance with known methods, for example, by conventional salting out with alkali metal salt, filtering and drying in vacuo at elevated temperatures. Depending on the reaction and isolation conditions a compound of formula I is obtained in free acid or preferably salt form or even mixed salt form containing, for example, one or more of the above-mentioned cations. It may be converted from free acid form to a salt form or mixture of salt forms or vice versa or from one salt form to another by conventional means.

The compounds of formula II are either known or may be prepared in accordance with known methods from cyanuric chloride by stepwise replacement of the chlorine atoms condensing with 1,3-diaminobenzene-4-sulphonic acid and a compound of the formula HNR$_1$R$_2$, respectively.

The compounds of the formula HNR$_1$R$_2$ are either known or may be prepared in accordance with known methods.

The compounds of formula I and mixtures thereof are useful as fibre reactive dyestuffs for dyeing or printing hydroxy group- or nitrogen-containing organic substrates. Preferred substrates are leather and fibre materials containing or consisting of natural or synthetic polyamides and, particularly, of natural or regenerated cellulose such as cotton, viscose and spun rayon. The most preferred substrates are textile materials containing or consisting of cotton.

Dyeing or printing is effected in accordance with known methods. However, for the compounds of formula I it is preferred to use the exhaust dyeing method. Advantageously, dyeing with these dyestuffs is not temperature dependent in the usual dyeing temperature range, especially when employing the conventional "all-in"-method according to which the necessary additives are added to the dyebath all at once when starting the dyeing process. Therefore, dyeing may be effected almost equally well at 80° C. as at 100° C. without any essential loss of fixation yield.

The compounds of this invention are well compatible with other reactive dyes; they may be applied per se or in combination with appropriate fibre reactive dyestuffs of the same class having analogous dyeing properties, e.g., concerning common fastness properties, extent of ability to exhaust from the dyebath onto the fibre, etc. The dyeings obtained with such combination mixtures have good fastness properties and are comparable to those obtained with a single dyestuff.

In view of their notable build-up power the compounds of formula I give high exhaust and fixation yields. The portion of unfixed dyestuff can be easily washed off the substrate. The compounds of this invention show good properties with respect to water solubility. They are well suited for dyeing in hard water in the presence of salt at usual dyeing temperatures since they do not precipitate during the dyeing process. Likewise, they do not show any sensitivity to electrolyte which is essential for the preparation of stable dye baths.

The dyeings obtained show good light fastness and wet fastness properties such as wash-, water-, sea water- and sweat-fastness. They are stable to any oxidative influences, e.g., chlorinated water, hypochlorite bleach and peroxide- or perborate- containing wash liquors.

The following examples further serve to illustrate the invention. In the examples all parts and percentages are by weight or volume. The temperatures are in degrees Centigrade.

EXAMPLE 1

180.25 Parts (=0.5 mole equivalents) of the compound of formula III,

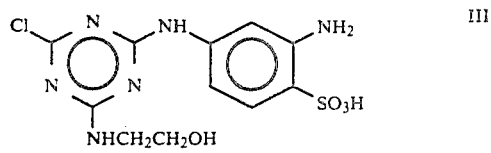

prepared in accordance with known methods by condensing cyanuric chloride with appropriate amounts of 1,3-diaminobenzene-4-sulphonic acid and ethanolamine, respectively, are dissolved in 1500 parts water at pH 7 and 35 parts sodium nitrite are added. This solution is cooled to 5° and is added dropwise to a mixture of 400 parts water, 120 parts concentrated hydrochloric acid and 500 parts ice whilst stirring. After two hours any excess nitrous acid is decomposed by the addition of a small amount of sulphamic acid.

76 Parts (=0.25 mole equivalents-5%) 1-amino-8-hydroxynaphthalene-3,6-disulphonic acid are sprinkled into the above obtained diazo mixture. The pH is adjusted to 4.2–4.4 by the addition of 50% sodium acetate solution and is kept in this range during the whole reaction by the addition of further amounts of sodium acetate solution. Reaction is effected at 5° until the pH of the mixture remains unchanged without any further addition of sodium acetate.

Subsequently, 30% sodium hydroxide solution is added dropwise to adjust the pH to 7.5–8.0. The coupling is completed when the addition of sodium hydroxide is no longer necessary to keep the pH in this range. Sodium chloride is then added in such an amount that the dyestuff thus prepared precipitates completely. It is filtered and dried in vacuo at 100°. The obtained dyestuff corresponding to the formula

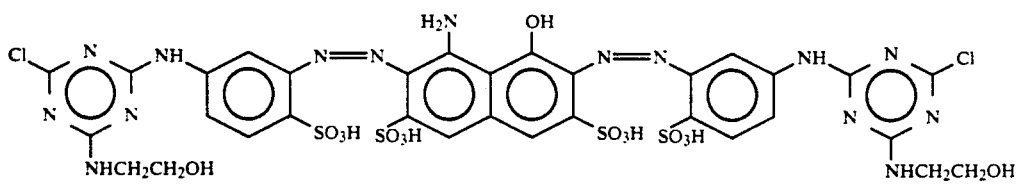

dyes cellulose fibres in navy blue shades. The dyeings show good light fastness and wet fastness properties and are stable to any oxidative influences.

EXAMPLES 2-13

By analogy with the method described in Example 1, using appropriate starting compounds of formula III, further compounds of formula I may be prepared which are listed in the following Table. The compounds of Examples 2-13 may be applied to cellulose fibres according to the conventional exhaust dyeing method. The dyeings obtained in all cases have navy blue shades; they show good light fastness and wet fastness properties and are stable to any oxidative influences.

TABLE

| Example No. | Both —$NR_1R_2$ Groups |
| --- | --- |
| 2 | —$NHCH_2CH_2CH_2OH$ |
| 3 | —$N(CH_2CH_2OH)_2$ |
| 4 | —$NHCH_2CHCH_2OH$<br>\|<br>OH |
| 5 | —$NHCHCH_2OH$<br>\|<br>$CH_2OH$ |
| 6 | —$NCH_2CH_2OCH_2CH_2OH$<br>\|<br>$CH_2CH_2CN$ |
| 7 | —$NHCH_2CH_2CH_2OCH_3$ |
| 8 | —$NHCH_2CHCH_3$<br>\|<br>OH |
| 9 | —$NHCH_2CH_2OCH_2CH_2OH$ |
| 10 | OH<br>\|<br>—$NCH_2CHCH_3$<br>\|<br>$CH_2CH_2OH$ |
| 11 | —$NHCH_2CH_2OCH_3$ |
| 12 | —$NHCH_2CH_2CH_2OCH_2CH_2OH$ |
| 13 | —$NHCH_2CH_2CH_2OCH_2CH_3$ |

In accordance with the method as described the dyestuffs of Examples 1 to 13 are obtained in sodium salt form. They may, depending on the reaction/isolation conditions or by reacting the sodium salts in accordance with known methods, also be obtained in free acid form or in other salt forms, for example those salt forms containing one or more cations indicated in the description above.

In the following examples the application of the dyestuffs of this invention is illustrated.

APPLICATION EXAMPLE A

To a dyebath consisting of 1000 parts water, 20 parts Glauber's salt (calcined), 2.5 parts sodium carbonate (calcined) and 1 part of sodium 1-nitrobenzene-3-sulphonate are added 50 parts mercerized cotton fabric. The bath is heated to 40° then 2.5 parts of the dye of Example 1 is added. The temperature are raised to 98° within 45 minutes; during this time 20 parts Glauber's salt (calcined) are added after 15 minutes and again 20 parts Glauber's salt (calcined) are added after further 15 minutes. At the end of this time 7.5 parts sodium carbonate (calcined) are added. Dyeing is continued at the boil for 45 to 60 minutes. Subsequently, the dyed fabric is removed from the liquor, rinsed with running hot water and washed at the boil for 15 minutes in 500 parts of demineralised water in the presence of 0.25 parts of a commercially available anion-active detergent. After rinsing and drying a navy blue cotton dyeing with good light fastness and wet fastness properties is obtained.

When 2.5 parts of a dye mixture consisting of 93.23 parts of the dyestuff of Example 1 and 6.77 parts of the dyestuff C.I. Reactive Red 55 are employed according to the method of Application Example A a reddish navy blue cotton dyeing is obtained having good fastness properties.

APPLICATION EXAMPLE B 0.5 Parts of the dyestuff of Example 1 are dissolved in 300 parts water. 10 Parts cotton fabric are added and the temperature of the dyebath is raised to 80° within 10 minutes. 15 Parts Glauber's salt (calcined) are added and 30 minutes thereafter, 3 parts sodium carbonate (calcined). Dyeing is continued for one hour at 80°. Subsequently, the dyed fabric is rinsed with running cold, then hot water and is washed according to the method given for Application Example A. After rinsing and drying a navy blue cotton dyeing having good fastness properties is obtained.

When 0.5 parts of the dye mixture consisting of 93.23 parts of the dyestuff of Example 1 and 6.77 parts of the dyestuff C.I. Reactive Red 55 are employed instead of 0.5 parts of the single dye of Example 1 a reddish navy blue cotton dyeing having good fastness properties is obtained.

Similarly, the dyes of Examples 2 to 13 or mixtures of the dyes of Examples 1 to 13 may be employed to dye cotton in accordance with the methods given for Application Examples A and B.

What is claimed is:

1. A compound of the formula

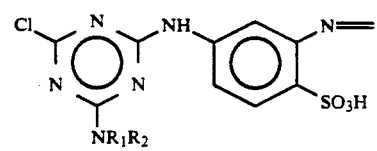

-continued

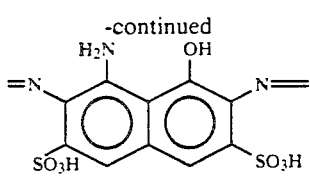

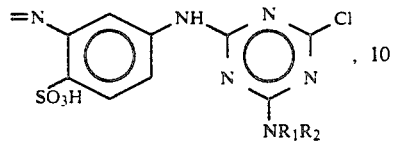

or a salt thereof,
wherein each $R_1$ is $C_{2-4}$alkyl substituted by 1 or 2 hydroxy groups or by one $-OR_3$ group, wherein $R_3$ is $C_{1-4}$alkyl or $C_{2-4}$hydroxyalkyl, and
each $R_2$ is hydrogen, $C_{2-4}$hydroxyalkyl or $-CH_2CH_2CN$, with the provisos that (i) both $-NR_1R_2$ groups are identical and (ii) when each $R_2$ is $-CH_2CH_2CN$, each $R_1$ must be $-CH_2CH_2OCH_2CH_2OH$,
or a mixture of such compounds each of which is in free acid form or salt form.

2. A compound according to claim 1, or a water-soluble salt thereof each cation of which is independently a non-chromophoric cation,
with the further provisos that each hydroxy group of each hydroxy-substituted alkyl group is in other than the 1-position, and the hydroxy groups of each alkyl group substituted by two hydroxy groups are on different carbon atoms,
or a mixture of such compounds each of which is in free acid form or a water-soluble salt form each cation of which is independently a non-chromophoric cation.

3. A compound according to claim 2, or a water-soluble salt thereof each cation of which is independently a non-chromophoric cation.

4. A compound according to claim 3, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

5. A compound according to claim 4, or a salt thereof each cation of which is independently lithium, sodium, potassium or ammonium.

6. A compound according to claim 5, or a salt thereof each cation of which is sodium.

7. A compound according to claim 3, or a water-soluble salt thereof each cation of which is independently a non-chromophoric cation,
wherein each $-NR_1R_2$ is $-NR_{1a}R_{2a}$ or

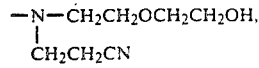

wherein each $R_{1a}$ is

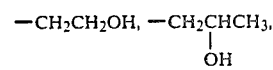

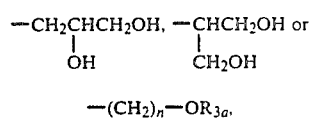

wherein each $R_{3a}$ is methyl or $-CH_2CH_2OH$, and each n is 2 or 3, and
each $R_{2a}$ is hydrogen or $-CH_2CH_2OH$.

8. A compound according to claim 7, or a water-soluble salt thereof each cation of which is independently a non-chromophoric cation,
wherein each $-NR_1R_2$ is $-NHR_{1b}$ or

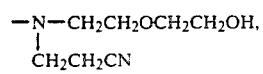

wherein each $R_{1b}$ is

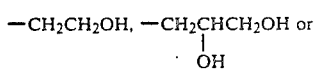

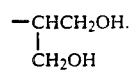

9. The compound according to claim 8 having the formula

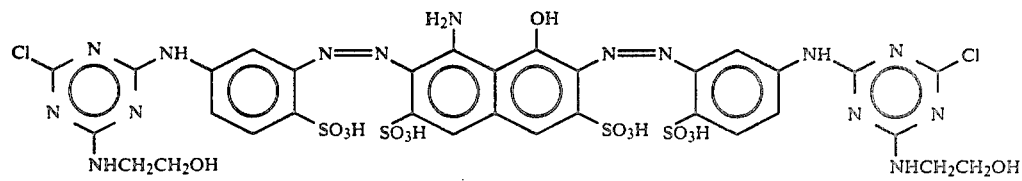

or a water-soluble salt thereof each cation of which is independently a non-chromophoric cation.

10. The compound according to claim 9 in sodium salt form.

11. The compound according to claim 8 having the formula

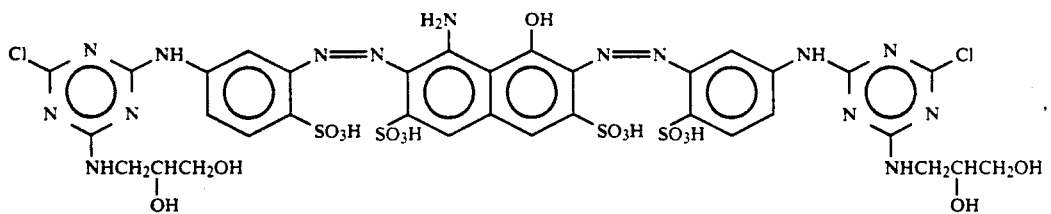

or a water-soluble salt thereof each cation of which is independently a non-chromophoric cation.

12. The compound according to claim 11 in sodium salt form.

13. The compound according to claim 7 having the formula

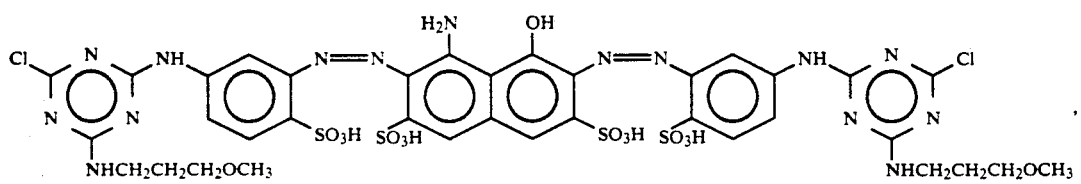

or a water-soluble salt thereof each cation of which is independently a non-chromophoric cation.

14. The compound according to claim 13 in sodium salt form.

15. The compound according to claim 7 having the formula

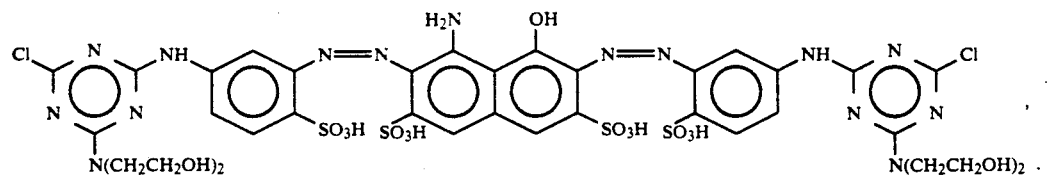

or a water-soluble salt thereof each cation of which is independently a non-chromophoric cation.

16. The compound according to claim 15 in sodium salt form.

17. The compound according to claim 3 having the formula

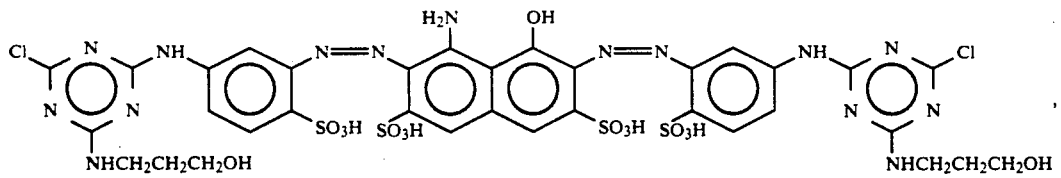

or a water-soluble salt thereof each cation of which is independently a non-chromophoric cation.

18. The compound according to claim 17 in sodium salt form.

* * * * *